US009942247B2

(12) United States Patent
Seul et al.

(10) Patent No.: US 9,942,247 B2
(45) Date of Patent: *Apr. 10, 2018

(54) TRAFFIC SHAPE OBFUSCATION WHEN USING AN ENCRYPTED NETWORK CONNECTION

(71) Applicant: International Business Machines Corporation, Armonk, NY (US)

(72) Inventors: Matthias Seul, Kassel (DE); Artemiy A. Solyakov, Hessen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/724,011

(22) Filed: May 28, 2015

(65) Prior Publication Data

US 2016/0241520 A1 Aug. 18, 2016

Related U.S. Application Data

(63) Continuation of application No. 14/621,949, filed on Feb. 13, 2015.

(51) Int. Cl.
*H04L 29/06* (2006.01)
*H04K 1/02* (2006.01)
(Continued)

(52) U.S. Cl.
CPC ........ *H04L 63/1408* (2013.01); *H04K 1/02* (2013.01); *H04L 9/002* (2013.01); *H04L 45/20* (2013.01);
(Continued)

(58) Field of Classification Search
None
See application file for complete search history.

(56) References Cited

U.S. PATENT DOCUMENTS 5,923,849 A * 7/1999 Venkatraman ........... H04B 3/46
370/355
6,917,974 B1 7/2005 Stytz et al.
(Continued)

FOREIGN PATENT DOCUMENTS

CA 2813758 A1 4/2012
WO 2016128265 A1 8/2016

OTHER PUBLICATIONS

Jeon, "POSTER: Obfuscation of Critical Infrastructure Network Traffic using Fake Communication", 2013, ACSAC, pp. 1-2.*
(Continued)

*Primary Examiner* — Benjamin E Lanier
(74) *Attorney, Agent, or Firm* — Robert C. Bunker

(57) ABSTRACT

According to one exemplary embodiment, a method for obfuscating a traffic pattern associated with a plurality of network traffic within a tunnel connection is provided. The method may include detecting the tunnel connection. The method may also include analyzing a connection environment associated with the detected tunnel connection. The method may then include determining a packet handling technique based on the analyzed connection environment, whereby the packet handling technique provides a way for creating a noise packet that will be discarded by a network stack at a target node or before the target node. The method may include determining a noise strategy based on the determined packet handling technique. The method may also include sending a plurality of noise packets into the tunnel connection based on the determined noise strategy to obfuscate the traffic pattern.

6 Claims, 8 Drawing Sheets

(51) Int. Cl.
*H04L 9/00* (2006.01)
*H04L 12/733* (2013.01)

(52) U.S. Cl.
CPC ........ *H04L 63/029* (2013.01); *H04L 63/0254* (2013.01); *H04L 63/0272* (2013.01); *H04L 63/0414* (2013.01); *H04L 63/0428* (2013.01); *G06F 2221/2125* (2013.01); *H04L 2209/08* (2013.01)

(56) References Cited

U.S. PATENT DOCUMENTS

| | | | |
|---|---|---|---|
| 7,640,215 B2 | 12/2009 | Wang et al. | |
| 7,873,731 B1* | 1/2011 | Leavy | H04L 63/1416 709/225 |
| 8,560,715 B1 | 10/2013 | Mahadik et al. | |
| 8,711,688 B1 | 4/2014 | Smith et al. | |
| 2006/0041653 A1* | 2/2006 | Aaron | G09B 7/00 709/223 |
| 2008/0034201 A1* | 2/2008 | Munger | H04L 29/12216 713/153 |
| 2010/0131664 A1* | 5/2010 | Veres | H04W 92/20 709/228 |
| 2012/0084464 A1* | 4/2012 | Cochinwala | H04L 43/026 709/246 |
| 2013/0227689 A1* | 8/2013 | Pietrowicz | G01R 1/20 726/23 |

OTHER PUBLICATIONS

Jeon, "Obfuscation of Critical Infrastructure Network Traffic Using Fake Communication", CRITIS 2014, Oct. 2014, pp. 268-274.*
IBM, "List of IBM Patents or Patent Applications Treated as Related (Appendix P)," May 28, 2015.
Seul et al., "Traffic Shape Obfuscation When Using an Encrypted Network Connection," Filed on Feb. 13, 2015, p. 1-46, U.S. Appl. No. 14/621,949.
Mell et al., "The NIST Definition of Cloud Computing," National Institute of Standards and Technology, Information Technology Laboratory, Oct. 7, 2009, Version 15.
Riboni et al., "Obfuscation of Sensitive Data in Network Flows," Proceedings IEEE INFOCOM, 2012, p. 2372-2380.
RT, "Former CIA director: 'We kill people based on metadata'," RT USA, May 12, 2014, p. 1-4, Autonomous Nonprofit Organization 'TV-Novosti', http://rt.com/usa/158460-cia-director-metadata-kill-people/, Accessed on Feb. 2, 2015.
International Searching Authority, "Notification of Transmittal of the International Search Report and the Written Opinion of the International Searching Authority, or the Declaration," Patent Cooperation Treaty, Apr. 14, 2016, 11 Pages, International Application No. PCT/EP2016/052230.

* cited by examiner

TRAFFIC SHAPE OBFUSCATION WHEN USING AN ENCRYPTED NETWORK CONNECTION

BACKGROUND

The present invention relates generally to the field of computing, and more particularly to network traffic security.

Network traffic security is a prominent concern due to the volume and sensitivity of data that may be transmitted over networks. A common solution to network security may be to employ encrypted transmissions. However, traditional network security has received more scrutiny with the rising concerns posed by intelligence agencies and other third-parties that may derive information from encrypted network communications.

SUMMARY

According to one exemplary embodiment, a method for obfuscating a traffic pattern associated with a plurality of network traffic within a tunnel connection is provided. The method may include detecting the tunnel connection. The method may also include analyzing a connection environment associated with the detected tunnel connection. The method may then include determining a packet handling technique based on the analyzed connection environment, whereby the packet handling technique provides a way for creating a noise packet that will be discarded by a network stack at a target node or before the target node. The method may include determining a noise strategy based on the determined packet handling technique. The method may also include sending a plurality of noise packets into the tunnel connection based on the determined noise strategy to obfuscate the traffic pattern.

According to another exemplary embodiment, a computer system for obfuscating a traffic pattern associated with a plurality of network traffic within a tunnel connection is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting the tunnel connection. The method may also include analyzing a connection environment associated with the detected tunnel connection. The method may then include determining a packet handling technique based on the analyzed connection environment, whereby the packet handling technique provides a way for creating a noise packet that will be discarded by a network stack at a target node or before the target node. The method may include determining a noise strategy based on the determined packet handling technique. The method may also include sending a plurality of noise packets into the tunnel connection based on the determined noise strategy to obfuscate the traffic pattern.

According to yet another exemplary embodiment, a computer program product for obfuscating a traffic pattern associated with a plurality of network traffic within a tunnel connection is provided. The computer program product may include one or more computer-readable storage devices and program instructions stored on at least one of the one or more tangible storage devices, the program instructions executable by a processor. The computer program product may include program instructions to detect the tunnel connection. The computer program product may also include program instructions to analyze a connection environment associated with the detected tunnel connection. The computer program product may then include program instructions to determine a packet handling technique based on the analyzed connection environment, whereby the packet handling technique provides a way for creating a noise packet that will be discarded by a network stack at a target node or before the target node. The computer program product may further include program instructions to determine a noise strategy based on the determined packet handling technique. The computer program product may also include program instructions to send a plurality of noise packets into the tunnel connection based on the determined noise strategy to obfuscate the traffic pattern.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
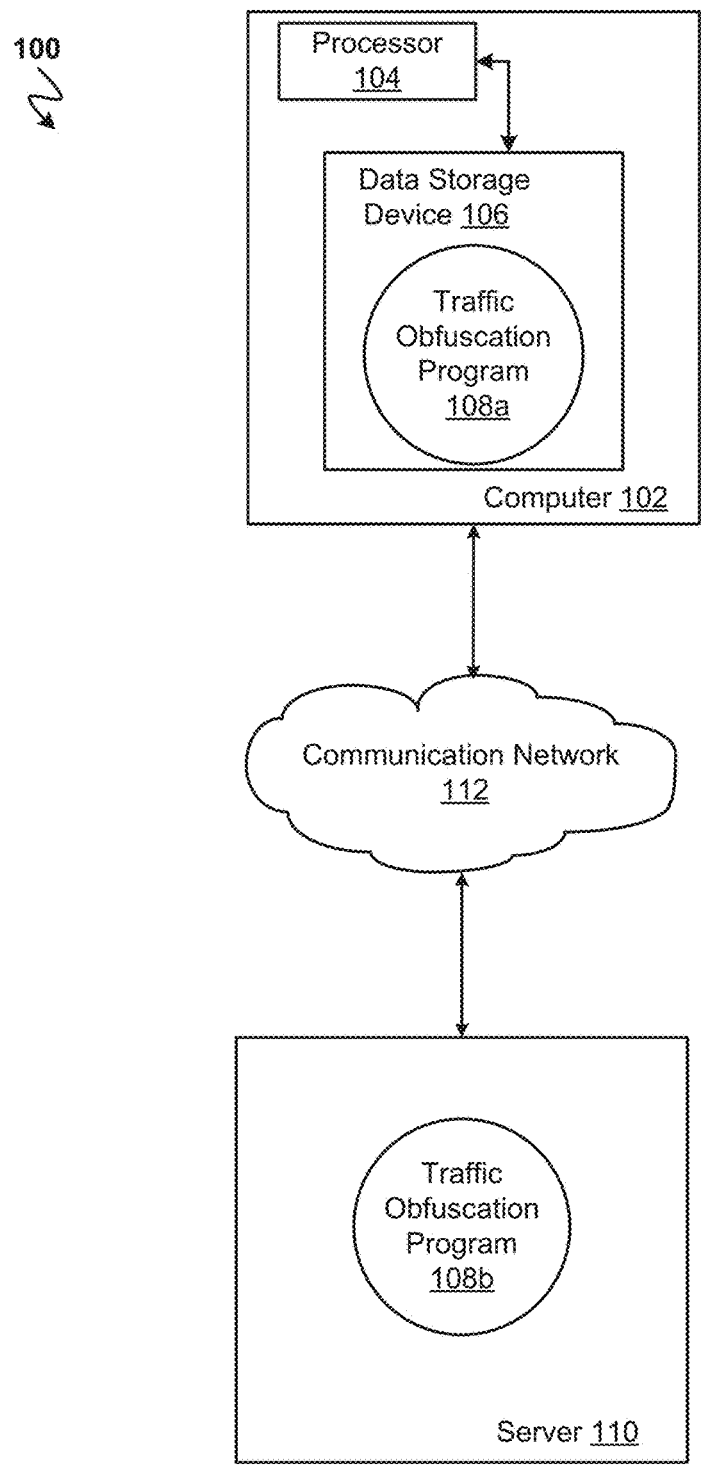
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for traffic shape obfuscation using encrypted network connections. Additionally, the present embodiment has the capacity to improve the technical field of network communication security by implementing network traffic shape obfuscation within existing network protocols.

As discussed above, network traffic security is an important consideration given the amount of sensitive data that is transmitted over networks. Data encryption may be employed to protect specific details contained within network traffic data. However, interested third-parties (e.g., internet service providers, intelligence agencies, etc.) may still obtain metadata by observing network traffic despite data encryption. Network traffic may generate unique and consistent traffic flow patterns moving through a network regardless of encryption. Certain activities (e.g., secure shell (SSH) connections, file transfers, peer-to-peer communications, voice over internet protocol (VoIP), etc.) may produce unique network traffic shapes (i.e., metadata) that may be recognized by a third-party. Recognizing network traffic shapes may not require any decryption of the traffic and may solely be performed on the basis of the shape or pattern of the network traffic being transferred. For instance, VoIP traffic is usually transferred by user datagram protocol (UDP) packets of a recognizable size with specific requirements for network jitter and delay. Interested third-parties may create intelligent algorithms for traffic shape pattern matching that may be used to block specific traffic patterns corresponding to activities that the third-party may wish to stop or collect information that may be used against the communicating parties. While third-parties may not know the content of the data that may be observed in network traffic, identifying the metadata showing the type of traffic and the communicating parties may still allow third-parties to obtain desirable information and create security concerns for the communicating parties.

Therefore, it may be advantageous to, among other things, provide a way to thwart a third-party's ability to obtain metadata associated with network communications based on network traffic shape.

According to at least one embodiment, insertion of polymorphic dynamic white-noise packets (i.e., packets containing irrelevant or garbage data) into the network traffic stream may be used to obscure, mask or alter the shape of network traffic to avoid presenting identifiable metadata to third-parties. Discovery and manipulation of existing network characteristics (e.g., time-to-live (TTL)) may be employed to obscure traffic that may be observable by third-parties while preventing white-noise packets from reaching the network traffic destination. By utilizing existing network framework parameters, no additional hardware or software may be necessary for the intended target of the network traffic. The target party of the network traffic may not need to be privy to the traffic shape obfuscation procedure since the process may be transparent from the target's perspective. Development and deployment complexity may be reduced dramatically by utilizing existing protocols to discard white-noise packets instead of using a hardware device or software at the target to filter the white-noise packets out of the network traffic. Additionally, greater efficiency may be achieved by not spending resources on actively filtering out white-noise packets at or near the destination target.

According to at least one embodiment, network traffic obfuscation may be implemented as a software solution running on an electronic device (e.g., server, computer, network switch, etc.). According to at least one other embodiment, network traffic obfuscation may be implemented as a hardware solution in a standalone machine or as an additional component connected to an electronic device. Additionally, the network traffic obfuscation process may be implemented as a software-only component, plug-in to an existing solution, hardware device, driver or on-chip firmware, or as other means that has read/write access to the tunnel connection.

Network traffic obfuscation may be accomplished according to various scenarios. Three scenarios are depicted below; however other implementations may be used depending upon differing circumstances, resources, and deployment conditions. Traffic obfuscation may first take place in a source-to-provider-obfuscation scenario. In a source-to-provider-obfuscation scenario, when traffic may be tunneled through an encrypted channel, the tunnel exit-points may configure a responder device that may be utilized to randomly generate white-noise packets (i.e., noise packets) and discard received white-noise packets. The added white-noise packets change the shape of traffic (i.e., traffic pattern) flowing through the encrypted tunnel, allowing software on either end to benefit from the white-noise without explicitly supporting the obfuscation. For example, a virtual private network (VPN) service provider may offer to enrich encrypted traffic flowing through the tunnel with white-noise traffic by configuring a responder device at the exit-points of the tunnel. Thus, network traffic entering the tunnel may enter through a responder device that adds white-noise packets and then through the tunnel to exit through another responder device that subsequently removes the white-noise packets at the end of the tunnel. The responder devices in the source-to-provider-obfuscation scenario may provide the entire service of both encrypting and adding white-noise without any of the communicating party's involvement.

A second traffic obfuscation scenario may include provider-to-end-obfuscation. For traffic destined to a target device that may enter an encryption provider network, the responder provided by the encryption provider may offer to add white-noise traffic to the actual traffic in order to obfuscate the traffic's shape. Provider-to-end-obfuscation would affect the delivery between the encryption service provider and the destination. The source party may communicate with the encryption service provider without any white-nose in this scenario.

A third traffic obfuscation scenario may include end-to-end-obfuscation. According to an end-to-end-obfuscation scenario, network traffic may be interleaved with white-noise at the sender before entering the encryption provider's entry node. Obfuscation remains in the traffic stream until the traffic reaches the destination device. Intermediate devices may not be involved in handling the white-noise. The destination may then discard the white-noise without disturbing the actual network traffic.

Network traffic shape obfuscation may be implemented in a variety of ways provided there may be read/write access to a tunnel on at least one of the communication peers. Access to the tunnel may include the ability to read content being sent in clear text, to modify traffic being sent and to unilaterally inject traffic. According to at least one implementation, network traffic shape obfuscation may be implemented as a standalone program running on the communication peer's machine that may have the ability to read traffic sent through an already established tunnel and may be able to send traffic unilaterally. According to at least one other implementation, network traffic shape obfuscation may be implemented as an extension to a tunnel client running on the communication peers handling the establishing of the encrypted tunnel and may be able to read packets from the tunnel and send packet through the tunnel. According to yet another implementation, network traffic shape obfuscation may be implemented as a transparent gateway trusted by both peers to act as an intermediate that may be able to intercept, decrypt and interact with content sent through the tunnel. According to another implementation, network traffic shape obfuscation may be implemented as a virtual private network (VPN) gateway server connecting two peers through a secured network with the encrypted tunnel established at the boundaries of said secured network. Other implementations may include, a software-only component, a plugin to an existing solution, a hardware device, or as a driver or on-chip firmware as long as read/write access to the tunnel may be established.

According to at least one embodiment, network traffic shape obfuscation may be used in situations involving secure tunnel connections. Secure tunnel connections may include a VPN connection secured by IPSec Encapsulating Security Payload running in Tunnel Mode where the entire original packet may be encapsulated. Network traffic shape obfuscation may be implemented by reacting to a new tunnel connection, analyzing the connection environment with handling of pending traffic, determining a noise strategy, executing the selected noise strategy, monitoring the connection and re-evaluating the noise strategy, and reacting to the termination of the tunnel connection.

The network traffic shape obfuscation process may be hooked into software callbacks, for example from a VPN client, that signal the establishment of a new tunnel connection. For example, a network client may allow the specification of commands to run once a connection has been established, thus allowing a signal to be sent to the network traffic shape obfuscation process.

However, if this integration is not available or not wanted, the network traffic shape obfuscation process may monitor the enabled network interfaces and routing tables. For network interfaces it may monitor the activation or deactivation and check if the network interface is provided not by a virtual VPN driver emulating a network card instead of actual hardware. If the network traffic shape obfuscation process detects a virtual interface, the process may identify the network as the tunnel network. For routing tables, the process may monitor if new network segments are set up to be routable and which gateways are being added. If these networks/gateways are from a list of know VPN endpoints, the process may identify the network as the tunnel network. If a tunnel network is detected, the process may integrate with the network stream by installing a filter driver into the network stack allowing the process to capture and modify packets as necessary similar to software-based firewalls (e.g., "Personal Firewalls"). However, if the driver has already been installed from a previous captured tunnel, the process may skip the installation of the filter driver. Depending on the driver's installation requirements, the network interface may be temporarily unavailable during the first use to integrate with the network stack. To ensure security of all connections, the process may also forcibly interrupt existing connections over the network interface if the process only attaches to newly established connections, to avoid leaving the existing connections unprotected. If the user is not allowed to install filter drivers into the network stack, the process may also run in the user space, generating white-noise traffic. Once the integration has been completed the process can hand over to the next step.

The traffic shape obfuscation process may then analyze the connection environment and determine how pending traffic may be handled. The nature of the connection environment may be determined by measuring metrics such as time to live (TTL), max hops, maximum transmission unit (MTU), malformed packet handling, packet drop handling, packet fragmentation handling, forced transmission algorithm changes, and transmission replay handling.

For example, the traffic shape obfuscation process may send test packets with altered TTL values to determine what TTL value will result in the packet reaching the last hop before the target recipient or some other target destination (e.g., a node beyond where an eavesdropping third-party may be monitoring network traffic) before being discarded. The traffic shape obfuscation process may also alter packets to be intentionally malformed to have the packets discarded at the target node as invalid. Additionally, a packet may also be flagged as "do not fragment" even though the packet may be sized in a way that exceeds the node's MTU. Packet fragmentation may also be used by reducing the MTU on the sender's side that may cause the transmission to be artificially fragmented into smaller packets.

The traffic shape obfuscation process may continue testing for other viable methods (e.g., algorithm changes, transmission replays, etc.) to manipulate packet handling to allow for white-noise packets to be introduced and discarded before reaching the target of the actual traffic (i.e., target for original non-noise packets). Once the traffic shape obfuscation process has tested various packet handling methods, the results may be used to determine what packet handling methods may be available to use for traffic obfuscation in the current tunnel environment. The tunnel detection process may then hand-off to strategy creation.

The obfuscation process gathers the data relating to different packet handling methods employed by the working network connection environment to create an obfuscation strategy that matches the network environment as this strategy relies on sending specifically crafted packets that will be rejected by the network stack at or as close as possible to the target node (i.e., the other peer). The idea behind this approach is that the obfuscation process can use standard network error detection and handling behaviors to generate traffic that can be easily detected as bogus by an entity that has clear-text access to the connection while being virtually identical to valid traffic from the perspective of a third-party eavesdropper. The obfuscation process may also coax the other peer to send standard network error reports (e.g., Internet Control Message Protocol (ICMP)) protecting the back channel even if the other side does not have the obfuscation process deployed. Using this approach the obfuscation process can warp the traffics shape without requiring any specific kind of preparation or software on the other peer's side.

The traffic shape obfuscation process may now have a list of available methods to create packets that are altered in a specific way to be rejected at or close to the target node. The obfuscation process may next determine how to best obfuscate the data sent through the tunnel. Four strategies may be available to that end: noise saturation, obfuscation of idle time, obfuscation of active time, and a mixed approach. Each method offers a trade-off between obfuscation and traffic generated. Depending on the user's requirements, such as the obfuscation process configuration and environmental parameters (e.g., such as a metered or low-bandwidth connection), the obfuscation process may choose a different strategy.

Once a noise strategy has been selected, the traffic obfuscation process may execute the selected strategy and begin inserting or altering the packets according to the chosen strategy using the methods determined as available to the connection.

During the execution of the selected noise strategy the traffic obfuscation process may measure the connection error rate. Since the obfuscation process may alter the packets being sent, the obfuscation process may seek to ensure the connection stays stable and reliable. This may be done by monitoring the reactions to both real traffic being sent and the packets sent by the obfuscation process. To generate a comparison benchmark, the obfuscation process may monitor, for example, the average number of packet errors for a period of 60 seconds, retransmits, drops and similar error reports on the network. The comparison benchmark may be used to determine the general connection health before intervening. After starting to execute the noise strategy, the obfuscation process may monitor if the volume packet errors is increasing, for example, by more than 10% in comparison to the benchmark. If this situation occurs, for example, within less than 120 seconds of the obfuscation process beginning to execute the strategy, the increased packet errors may be considered a result of the obfuscation process' activity. Since this situation may create a performance degradation for the user, the obfuscation process may have the option of informing the user that the connection may react negatively to the obfuscation attempt (e.g., due to technical reasons or an outside party intentionally creating a negative reaction) and have the user consent to continuing the obfuscation, terminate the connection or reduce/disable the obfuscation traffic at the potential cost of privacy.

If the obfuscation process detects that the intentionally altered packets the obfuscation process sends are suddenly being accepted or rejected at a different hop-level than before, the obfuscation process may disable the used method for this connection and begin re-measuring it on-the-fly as in the initial setup to determine if the connection condition has changed (e.g., different route) and the packets need to be crafted in a different way.

The obfuscation process may also re-measure all methods regardless of their status after the initial evaluation at a predetermined time interval (e.g., every 10 minutes) to determine if the connection has changed in transit (e.g., different route, gateway changed, different endpoint). The obfuscation process may thus update the list of available methods and their respective configuration on-the-fly.

If during any of the evaluation no further methods are available the obfuscation process may immediately prompt the user and inform that the obfuscation process can no longer reliably perform obfuscation and may present the user the option to terminate the connection or continue with reduced privacy.

Additionally, if the tunnel is closed, the traffic shape obfuscation process may immediately stop any active noise strategies. The obfuscation process may then record for this specific tunnel and target node along with what methods were available, what methods worked reliably over the course of the connection and what strategies were used. These records may be stored in a database for re-use in future connections with the same tunnel/target node combination. If a recorded tunnel/target node combination is used while initiating the connection, the obfuscation process may skip the initial measuring and immediately skip to executing a noise strategy relying on the previously determined data. To ensure the obfuscation process may not be running on old information, the obfuscation process may start the measuring process in the background. This may allow the obfuscation process to provide protection for newly established connections quicker.

Using the approach outlined above, the traffic shape obfuscation process may utilize standard network behaviors to be able to inject bogus traffic (i.e., white noise packets) into a tunnel connection that may be safely and automatically rejected by the communication peer while an outside attacker may be hindered from determining the nature of the transmission based on the traffic shape. The obfuscation process may utilize multiple methods and strategies to handle different network scenarios while also being able to account for bandwidth and volume constraints. By employing the mixed noise approach, the obfuscation process may offer heightened privacy without saturating the connection with useless noise. Thus the obfuscation process may protect the user's privacy and conserve bandwidth. The obfuscation process therefore may be able to successfully prevent the creation of metadata by outside attackers, such as intelligence agencies, resulting in increased privacy of secured connections.

Referring now to FIG. 1, an exemplary networked computer environment 100 in accordance with one embodiment is depicted. The networked computer environment 100 may include a computer 102 with a processor 104 and a data storage device 106 that is enabled to run a traffic obfuscation program 108a. The networked computer environment 100 may also include a server 110 that is enabled to run a traffic obfuscation program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 402a and external components 404a, respectively and client computer 102 may include internal components 402b and external components 404b, respectively. Client computer 102 may be, for example, a mobile device, a telephone, a PDA, a netbook, a laptop computer, a tablet computer, a desktop computer, or any type of computing device capable of running a program and accessing a network.

A program, such as a traffic obfuscation program 108a and 108b may run on the client computer 102 or on the server computer 110. The traffic obfuscation program 108a and 108b may be used to obfuscate encrypted network traffic to prevent another party from deriving information about encrypted traffic by observing the traffic pattern. The traffic obfuscation program 108a and 108b is explained in further detail below with respect to FIGS. 2A-2C.

Figure 2A:
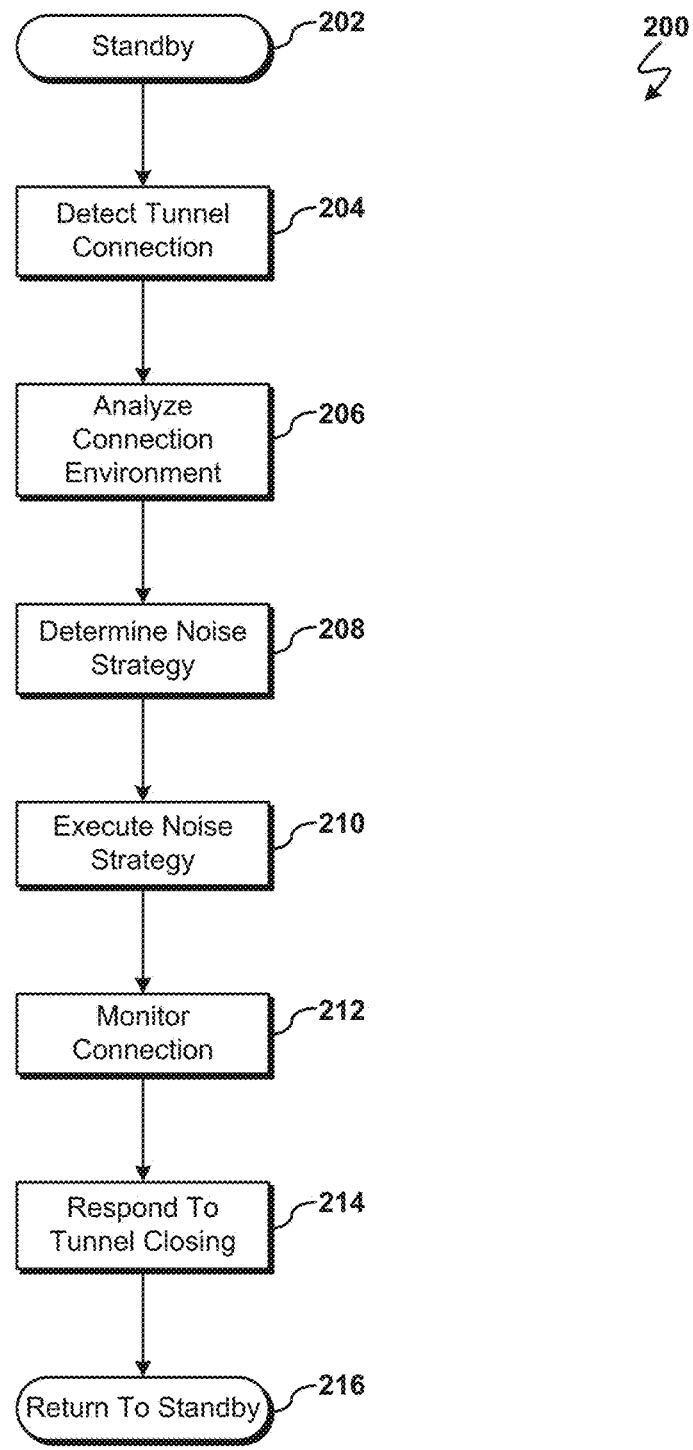
FIG. 2A is an operational flow chart illustrating a traffic shape obfuscation process according to at least one embodiment.

Referring now to FIG. 2A, an operational flow chart illustrating the exemplary traffic shape obfuscation process 200 by the traffic obfuscation program 108a and 108b (FIG. 1) according to at least one embodiment is depicted. The traffic shape obfuscation process 200 may start in a standby status at 202 and not actively intervene to obfuscate traffic until, for instance, a predefined condition is determined to exist or a user requests traffic shape obfuscation.

At 204, the traffic shape obfuscation process 200 may detect an accessible tunnel connection. Tunnel detection will be described in further detail with respect to FIG. 2B. According to at least one embodiment, the traffic shape obfuscation process may work in concert with software callbacks, for example, from a VPN client that may signal the establishment of a new tunnel connection.

Next, at 206, the connection environment (i.e., tunnel) may be analyzed for available methods for traffic shape obfuscation that may be used in the new tunnel connection. Obfuscation methods may include packet handling methods such as TTL, MTU, packet transmission replays. The traffic shape obfuscation process 200 may test various packet handling methods to determine which methods may reliably be manipulated to allow white-noise packets to be introduced into the tunnel connection and be discarded before reaching the destination for the real network traffic. Using existing packet handling methods (e.g., TTL), the traffic shape obfuscation process 200 may transparently obfuscate network traffic shape without the destination entity (e.g., user) knowing about the obfuscation or requiring the destination entity to have any additional means for handling the obfuscated traffic. Tunnel analysis is described in further detail below with respect to FIG. 2C.

Next, at 208, a white-noise strategy may be determined. According to at least one embodiment, the traffic shape obfuscation process 200 may use the determined available packet handling methods in conjunction with a strategy to execute traffic shape obfuscation. For example, four possible strategies may include noise saturation, obfuscation of idle time, obfuscation of active time and a mixed approach. Determining the strategy to employ may be predicated based on the trade-off between obfuscation and the amount of additional traffic generated through the introduction of white-noise packets. For example, the traffic shape obfuscation process 200 may choose a noise strategy depending on the user's requirements, the traffic shape obfuscation process' 200 configuration and environmental parameters (e.g., metered or low bandwidth connection). Currently there are at least four known obfuscation strategies including a noise saturation strategy, an idle time obfuscation strategy, an active time obfuscation strategy and a mixed approach.

The simplest obfuscation strategy may make traffic in the tunnel indistinguishable from the outside by filling all unused capacity under a given limit with noise (i.e., noise saturation). The noise saturation approach may incur the highest amount of traffic for both peers (i.e., originating entity and destination entity); however the noise saturation approach may be optimized to become a safe and simple approach to obfuscate network traffic by applying the traffic shape obfuscation process 200 according to the present embodiment described herein. To employ noise saturation, the traffic shape obfuscation process 200 may first determine the theoretical maximum bandwidth of the target connection (e.g., 54 Mbit/Sec). The traffic shape obfuscation process 200 may, at predetermined intervals (e.g., 3 seconds), measure the current amount of traffic flowing in both directions and build a moving average of bytes/second in a window of time (e.g., 60 seconds). If no average may be determined (e.g., since the traffic is very erratic or the connection is idle) the traffic shape obfuscation process 200 may use a predetermined percentage, such as 20% of the theoretical maximum, as a default average. Once an average has been determined, the traffic shape obfuscation process 200 may begin sending packets with random payload content (i.e., white-noise packets) and configured to be dropped as invalid using a rotating, random choice out of the determined packet handling methods (e.g., TTL, max hops, etc.) to saturate the connection (e.g., 60% of the determined average). The traffic shape obfuscation process 200 may furthermore add quality of service (QoS) headers to the packet being transmitted to have the packets handled with lower priority than actual traffic (i.e., non-noise traffic or the actual traffic that needs to be sent to the target entity without detection by a third-party). The noise saturation strategy may flatten the traffic curves on the connection while at the same ensuring that the actual traffic is reaching the target with no interruption or delay.

Using obfuscation of idle time, the traffic shape obfuscation process 200 may avoid making traffic patterns distinguishable by manipulating or obfuscating pauses in-between packet peaks, denying an outside attacker (e.g., third-party eavesdropper) from determining a traffic pattern rhythm. Obfuscating pauses in-between packet peaks may be done by introducing noise whenever the connection drops to idle. The traffic shape obfuscation process 200 may begin measuring the traffic going over the connection and determine the theoretical maximum and average size. The traffic shape obfuscation process 200 may then check for periods of time (e.g. 10-50 ms) where no transmission is occurring or the volume of packets being transmitted is less than, for example, 10% of the average volume size. If any of the two conditions may be present, the traffic shape obfuscation process 200 may determine the current connection situation to be in an "idle" state. The traffic shape obfuscation process 200 may then begin inserting randomly generated packets into the stream that are crafted to be invalid according to a rotating, random choice out of the previously determined methods (e.g., TTL, max hops, MTU, etc.). For example, to emulate actual activity, the traffic shape obfuscation process 200 may randomly choose from three strategies to fill the "idle" time: completely random, sine wave, and stream replay.

The first possible strategy, the completely random strategy, may be employed by the traffic shape obfuscation process 200 by randomly choosing the size of the packets being crafted between predetermined percentages, such as between 50% and 150% of the determined average.

The second possible strategy, the sine wave strategy, may be employed by the traffic shape obfuscation process 200 to create a sine wave pattern with rising and falling packet sizes starting at, for example, 30% of the average and going up to 150%. The traffic shape obfuscation process 200 may also randomly choose to invert the pattern or modify the amplitude or interval of the generated wave pattern.

Finally, if the replay strategy was determined to be available at previously described step 206, then the traffic shape obfuscation process 200 may capture packet streams being transmitted over the tunnel and replay them entirely or replay random sections out of them to fill gaps in the traffic.

The traffic shape obfuscation process 200 may monitor if the actual traffic resumes and exceeds a predetermined threshold (e.g., 10% average threshold). The traffic shape obfuscation process 200 may then immediately stop sending packets once the threshold condition is reached. In order to make the traffic look more natural, the traffic shape obfuscation process 200 may also extend the obfuscation by not stopping immediately and instead scale back the packet sending in relation to the amount of "real" traffic being sent. For example, if real activity (i.e., actual traffic) is less than 10%, full generation of random packets may be employed. If real activity is greater than or equal to 10% and less than 20%, random packets may be generated up to 50% of the traffic. If real activity is greater than or equal to 20%, the obfuscation process may stop generating random packets to add to network traffic. The idle time obfuscation approach may generate a constant, low load on the connection while creating difficulty in determining gaps in packet transmission.

The traffic shape obfuscation process 200 may also utilize active time obfuscation similarly to idle time obfuscation discussed above with the difference that the traffic shape obfuscation process 200 may monitor for activity above a threshold value, such as 20% of the average. If activity exceeds the threshold value, the traffic shape obfuscation process 200 may begin sending random packets with the QoS header set to prefer actual traffic. The traffic shape obfuscation process 200 may then scale activities in a way that may not hamper actual traffic if the connection gets close to saturation by scaling random noise packet insertion based on actual traffic activity. For example, random packets may not be generated and inserted into the traffic if actual traffic activity is less than 20% or greater than 70%. If actual traffic activity is between 20% and 50%, the traffic shape obfuscation process 200 may generate 10%-20% of additional traffic with random packets. It actual traffic activity is between 50% and 70%, the traffic shape obfuscation process 200 may generate 5%-10% of additional traffic with random packets.

Active time obfuscation may be utilized to make activities hard to distinguish from each other by leaving the high/low throughput scenarios untouched. Using active time obfuscation may allow conservation of traffic as idle times may not be filled with traffic.

Finally, the traffic shape obfuscation process 200 may also combine active time obfuscation with idle time obfuscation to take a mixed approach. Using a mixed approach, idle time obfuscation may be employed where actual traffic activity, for example, drops below 20% and employ active time obfuscation where actual traffic activity exceeds 20%. The mixed approach may provide results that may be closer to complete saturation approach however with reduced traffic volume.

Then, at 210, the chosen noise strategy may be executed. According to at least one embodiment, the traffic shape obfuscation process 200 may choose a strategy (e.g., a mixed approach) and execute the chosen strategy through the use of one or more of the available packet handling methods (e.g., TTL, max hops, MTU, packet transmission replays, etc.).

At 212, the traffic shape obfuscation process 200 may monitor the connection environment and re-evaluate the noise strategy. According to at least one embodiment, the connection error rate may be continuously monitored to detect if the analysis of the connection environment performed at 206 may no longer accurately represent the current connection environment. As described above, the traffic shape obfuscation process 200 may have predetermined thresholds (e.g., preprogrammed or entered by a user via a graphical user interface (GUI)) for average numbers of packet errors, retransmits, drops and similar error reports. If the measured error reports fall outside of predetermined thresholds, the traffic shape obfuscation process 200 may re-evaluate (i.e., re-analyze) the noise strategy. For example, if the traffic shape obfuscation process 200 detects that intentionally altered white-noise packets that were sent are no longer being accepted or are being rejected at a different hop-level than before, the traffic shape obfuscation process 200 may cease using the selected packet handling method (e.g., TTL) and begin measuring on-the-fly what alterations to packets are needed to achieve the traffic shape obfuscation process' 200 goals with regards to white-noise packet life (i.e., determining what alterations are needed to have the white-noise packets rejected after third-party eavesdroppers and before the target destination). The traffic shape obfuscation process 200 may also re-evaluate the noise strategy at fixed intervals (e.g., every 10 minutes) to detect changes to the connection environment.

Next, at 214, the traffic shape obfuscation process 200 may respond to the tunnel connection closing. According to at least one embodiment, if the tunnel closes, the traffic shape obfuscation process 200 may immediately stop any active obfuscation strategies. The traffic shape obfuscation process 200 may then record details corresponding to the tunnel connection such as available packet handling methods, target node and what packet handling methods may have been reliable during the execution of traffic obfuscation within the tunnel. The recorded details may be stored in a data repository, such as a database, for future retrieval by the traffic shape obfuscation process 200 if the traffic shape obfuscation process 200 detects the same tunnel connection and target node combination. The reused details may allow the traffic shape obfuscation process 200 to determine a noise strategy more efficiently through using previously accrued knowledge of the tunnel and target node environment.

Finally, the traffic shape obfuscation process 200 may return to standby status at 216 to await a condition or instructions to return to active use.

Figure 2B:
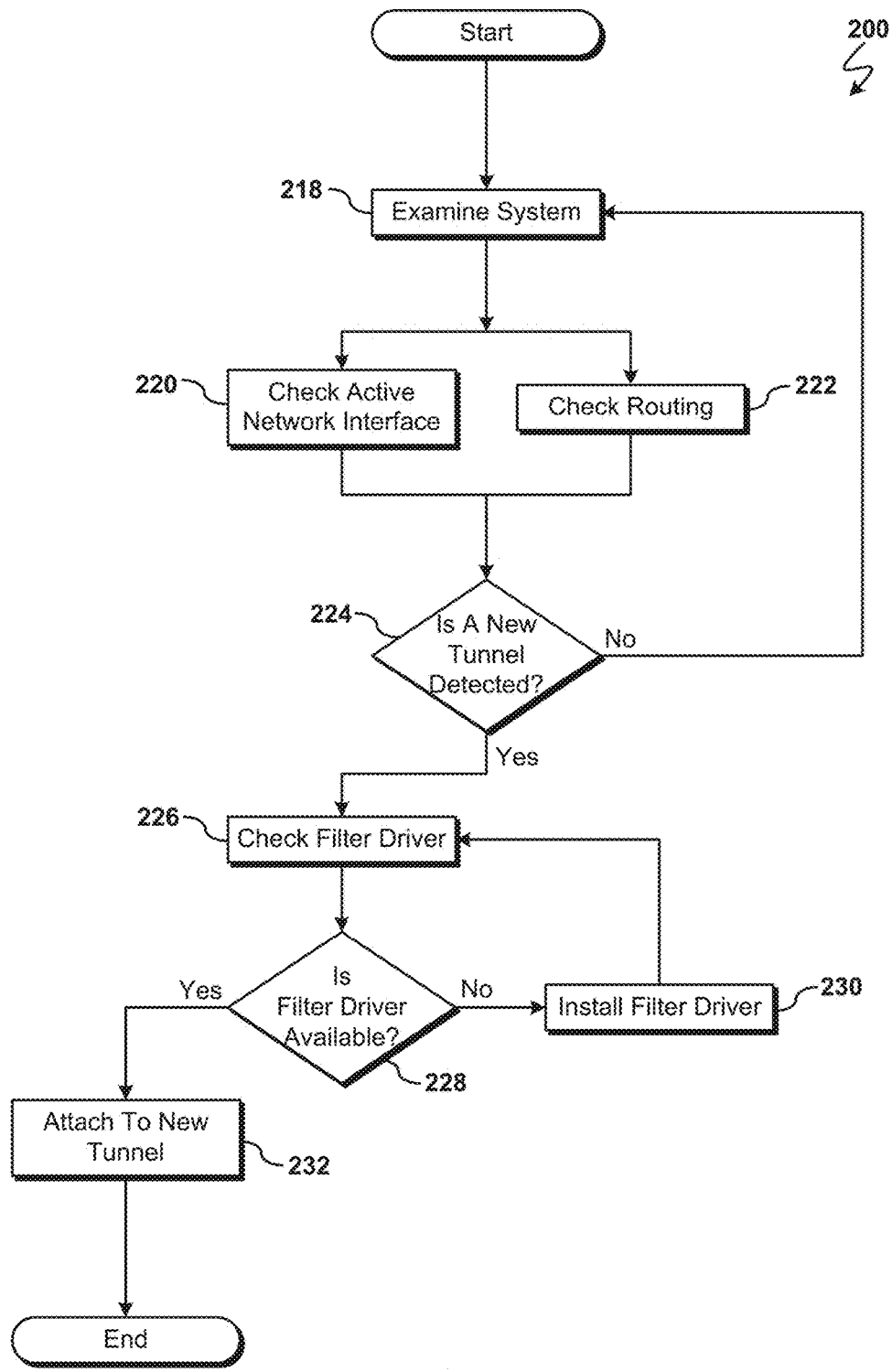
FIG. 2B is an operational flow chart illustrating a process for tunnel detection according to at least one embodiment.

Referring now to FIG. 2B illustrating in further detail the tunnel detection step 204 (FIG. 2A), after starting, the traffic shape obfuscation process 200 may begin to examine the current system environment at 218. The traffic shape obfuscation process 200 may examine the system by checking for active network interfaces at 220 and check routing tables at 222.

At 220, the traffic shape obfuscation process 200 may monitor network interfaces for activation or deactivation and determine if the interface is physical hardware or a virtual interface (e.g., by a virtual VPN driver).

Then, at 222, traffic shape obfuscation process 200 may monitor routing tables to detect if new network segments may be set up to be routable and what gateways may be added.

Next, at 224, the traffic shape obfuscation process 200 may determine if a new tunnel network is detected from checking the active network interfaces 220 or by checking routing tables 222. If the traffic shape obfuscation process 200 detects a virtual interface at 220, the network may be identified as a tunnel network. If the added networks and gateways detected at 222 by the traffic shape obfuscation process 200 are from a list of known endpoints (e.g., VPN endpoints) the traffic shape obfuscation process 200 may identify the network as a tunnel network. However, if no new tunnel network is detected at 224, the traffic shape obfuscation process 200 may return to 218 to continue examining the system for a new tunnel network.

If a new tunnel network was detected at 224, the traffic shape obfuscation process 200 may check the filter driver at 226. The traffic shape obfuscation process 200 may then check for the presence of an available existing filter driver that may be present due to a previously captured tunnel at 228.

However, if no filter driver is detected at 228, the traffic shape obfuscation process 200 may install a filter driver into the network stack at 230 that may allow the traffic shape obfuscation process 200 to capture and modify packets as necessary, similar to software-based firewalls. Once the filter driver is installed at 230, the traffic shape obfuscation process 200 may return to 226 to check that the installed filter driver is now available.

If there is an available filter driver detected at 228, the traffic shape obfuscation process 200 may use the available filter driver to attach to the new tunnel network at 232.

Figure 2C:
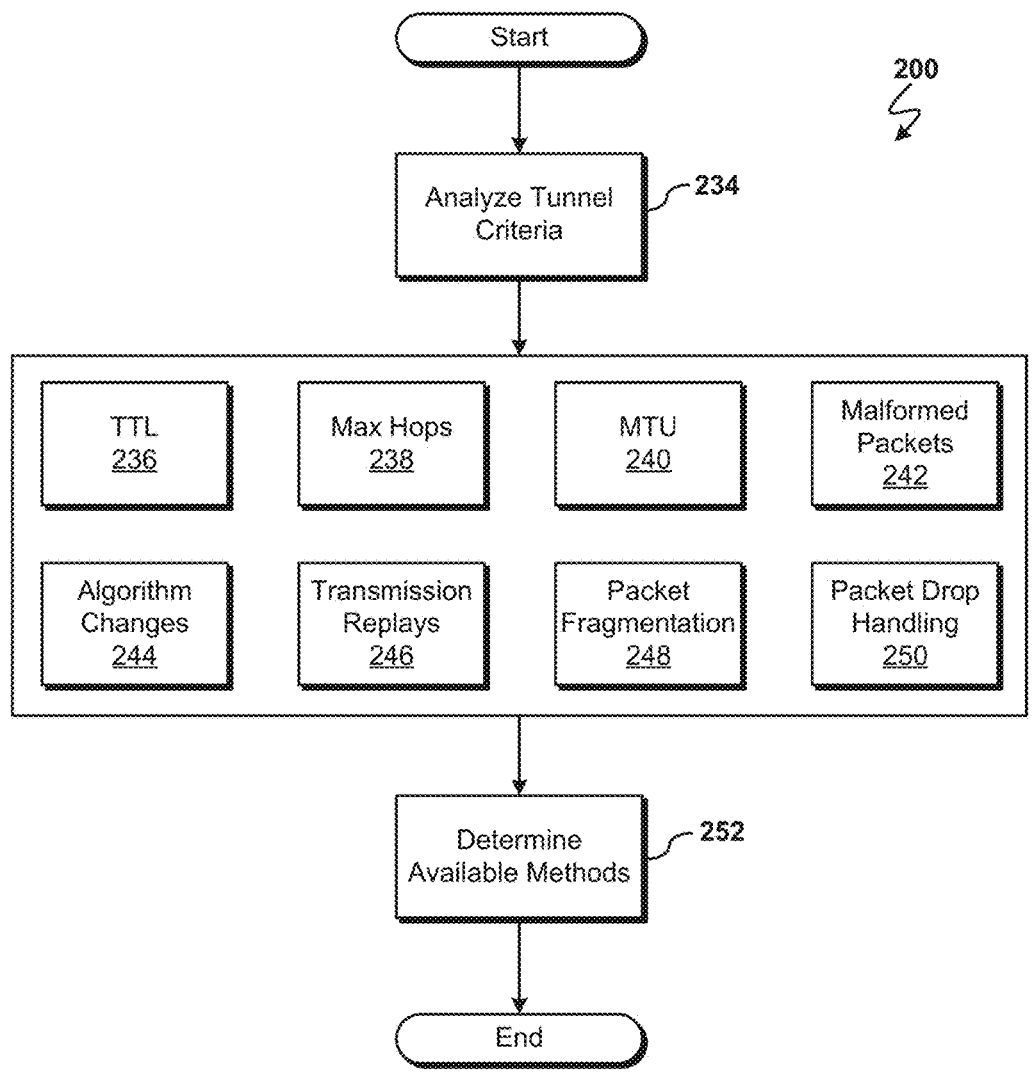
FIG. 2C is an operational flow chart illustrating a process for tunnel analysis according to at least one embodiment.

Referring now to FIG. 2C illustrating in further detail the analyzing connection environment step 206 (FIG. 2A), the traffic shape obfuscation process 200 may begin to analyze the newly established tunnel. At 234, the traffic shape obfuscation process 200 may analyze tunnel criteria by testing a variety of packet handling techniques to find what techniques may be available in the tunnel network.

One technique of packet handling that the traffic shape obfuscation process 200 may test is a packet time to live (TTL) technique 236 by examining packets sent over the tunnel by other applications to the target node and reading the TTL flag from the packet header. The traffic shape obfuscation process 200 may capture a selection of packets sent over a reliable transport protocol (i.e., the packets will be retransmitted if lost and also acknowledged when received) and iteratively modify the packet's TTL value (i.e., packet's TTL attribute) to find the lowest TTL after which the target node no longer answers. The general location strategy may be, for example, to send a packet with half the original TTL and check if the packet is acknowledged by the other node. If the packet is acknowledged, another packet may be captured and have the TTL value reduced by another half. The process of reducing the TTL may be repeated until the other node no longer acknowledges. Once the packet is no longer acknowledged, the TTL setting may be heuristically increased and resent until the other node acknowledges. Finally, the determined TTL value may be decremented by one (i.e., one hop before the destination).

Another potential approach may be to generate connectionless protocol packets with the determined TTL value and wait for the "port unreachable" response or a similar indicator. The above technique may also be applied to some of the metric measuring scenarios mentioned below.

Similarly to the TTL technique 236 described above, a packet max hops technique 238 may be tested to check how many nodes a given packet may visit before the packet is delivered. The determined max hops value that allows the packet to be delivered on the last hop minus one may be then be recorded.

The traffic shape obfuscation process 200 may also test a maximum transmission unit (MTU) technique 240 to assess what MTU value (i.e., MTU attribute) may no longer accepted by the network channel. The traffic shape obfuscation process 200 may assess MTU by determining the currently set MTU for the connection through capturing TCP packets in the tunnel and slowly increasing packet size by, for example, either appending false headers (e.g., if using IPv6), appending the payload with zeros (and adjusting the packet header accordingly) or stacking several packets into a bigger packer. The traffic shape obfuscation process 200 may slowly increase the byte size until the traffic shape obfuscation process 200 receives a "must fragment" response from the network. If a packet is accepted, the traffic shape obfuscation process 200 may capture the next packet traversing the tunnel to modify. Once a "must fragment" response is received, the traffic shape obfuscation process 200 may compare the number of hops in the return packet to the determined max hops size to find out if the node or a middlebox close to the node has rejected the packet size. If the rejecting hop is the node or a middlebox directly connected to the destination node, the MTU technique 240 may be used and the determined packet size recorded.

A malformed packet technique 242 may also be tested by the traffic shape obfuscation process 200 to determine how the node may handle malformed packets by capturing reliable transport protocol packets in the tunnel and modify the checksum or alter the headers with invalid data. If a packet is nevertheless accepted, the attempted technique may be ignored for further use. If a packet resend is reported by the other node, the traffic shape obfuscation process 200 may, similar to the MTU technique 240, determine if the packet has been rejected by the node or a middlebox directly connected to the node. If packet is rejected, the used technique may be flagged as working and may be taken into account for future use. Malformed packets, if rejected by the destination node correctly, can also be used as test packets for determining network characteristics such as MTU, TTL and others.

Additionally, the traffic shape obfuscation process 200 tests an algorithm change technique 244 by forcing the communication partners to switch reliable transport protocol algorithms (i.e., congestion handling algorithms) by communicating to the network stack of the sending node to change the algorithm. If the node has switched the algorithm, the traffic shape obfuscation process 200 may consider forced switching (i.e., algorithm change technique 244) as a valid technique to introduce white-noise packets.

The traffic shape obfuscation process 200 may also test a transmission replay technique 246 after determining the availability of at least one or two packet modification techniques that cause the other peer to drop sent packets. The traffic shape obfuscation process 200 may, for example, record a stream of packets between 1 and 60 seconds (depending on available buffers and memory) and modify each packet in the stream to be considered invalid by the other peer. The traffic shape obfuscation process 200 may also modify the contents of the packets to be replaced with random data instead of using useful information that matches the actual size of the original packet. Once the packet modification is done, the traffic shape obfuscation process 200 may mark the packet header so that responses can be tied directly to the stream. Afterwards, the traffic shape obfuscation process 200 may send the modified stream into the tunnel and monitor how the other peer or any of the middleboxes react. If no acknowledgement responses are recorded (e.g., just rejections) the method may be considered to be working as the other node did not inadvertently accept the data stream. The above approach may minimize the risk of interfering with valid network operations while doing a stream replay.

An artificially introduced packet fragmentation technique 248 may also be used by the traffic shape obfuscation process 200 by either conducting the fragmentation and re-assembly (e.g., done in both software and hardware boxes) or by capturing incoming and outgoing packets and sending "must fragment" responses for varying sizes, thus prompting the peers to adjust their MTU size dynamically during the transmission.

The traffic shape obfuscation process 200 may also use a randomly dropped packed technique 250 by randomly dropping reliable transport protocol packets coming from the sender node and check if the sender node properly resends them. If the sender node properly resends dropped packets, packet dropping may be considered valid for future use by the traffic shape obfuscation process 200. The traffic shape obfuscation process 200 may also send packet resend requests for already received packets from the other node and check if the other node properly resends them. If this is the case, the traffic shape obfuscation process 200 may record that resend requests are working and valid for future use while at the same time capture the resent packets and drop them since the original packet has already been received.

After attempting one or more of the above techniques, the traffic shape obfuscation process 200 may compile a list of available packet handling techniques at 252 determined from the results of testing various packet manipulations.

Figure 3:
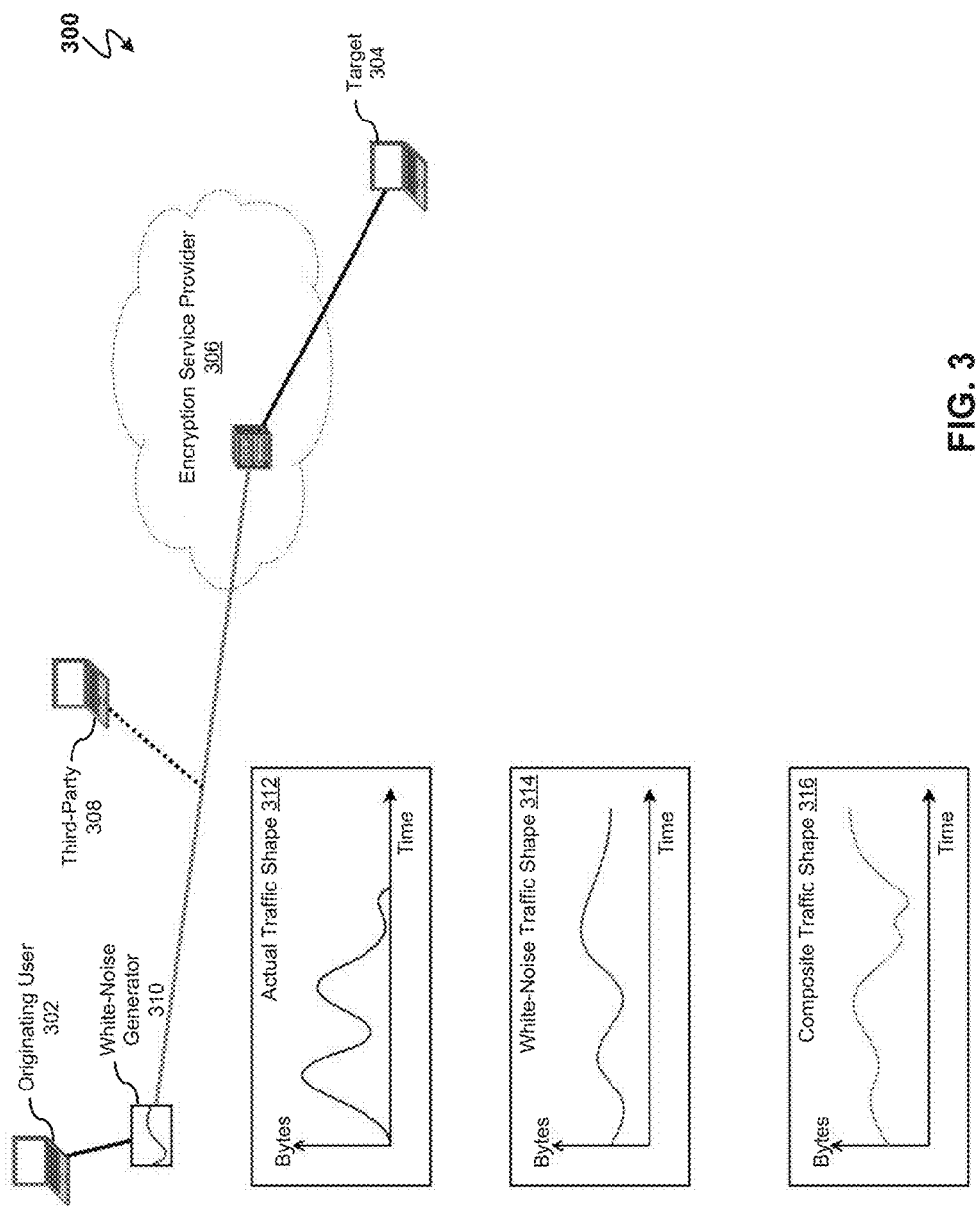
FIG. 3 illustrates a network tunnel environment running the traffic shape obfuscation process.

Referring now to FIG. 3, a tunnel network environment 300 is depicted. The depicted tunnel network environment 300 illustrates a scenario where the originating user 302 is communicating with the target 304 through an encryption service provider 306 (e.g., VPN). A third-party 308 eavesdropper may intercept encrypted network communication between the originating user 302 and the target 304 and attempt to perform analysis on the intercepted encrypted network traffic in order to generate metadata corresponding to the intercepted communications. The originating user 302 using a white-noise generator 310 executing the traffic shape obfuscation process 200 (FIGS. 2A-2C) upstream of the third-party 308 may obfuscate the shape of the encrypted communications sent through the encryption service provider 306. The white-noise generator 310 may analyze the actual traffic shape 312 and generate white-noise traffic having a white-noise traffic shape 314 using the traffic shape obfuscation process 200 (FIGS. 2A-2C) described above. The traffic shape obfuscation process 200 (FIGS. 2A-2C) may add the white-noise to the actual traffic to create a composite traffic shape 316 representing the added white-noise traffic transmitted beside actual traffic. Since the white-noise generator 310 is upstream of the third-party 308 in the depicted tunnel network environment 300, the third-party 308 may intercept and analyze the composite traffic shape 316 that has been obfuscated. Therefore, the third-party 308 may not be able to derive correct metadata from the intercepted encrypted communication. At a point beyond the third-party eavesdropper 308 and upstream of the target 304 (e.g., at the encryption service provider 306), the white-noise traffic may be discarded based on the packet handling methods employed (e.g., TTL, MTU, etc.) and the target may receive the actual traffic shape 312 without having to be privy to any obfuscation that occurred upstream.

It may be appreciated that FIGS. 2A-2C and FIG. 3 provide only an illustration of one embodiment and does not imply any limitations with regard to how different embodiments may be implemented. Although the network obfuscation process 200 (FIGS. 2A-2C) was described with respect to a tunnel connection, the network obfuscation process 200 (FIGS. 2A-2C) may also be applied to network environments not involving a tunnel connection and environments that do not use encryption. Many modifications to the depicted embodiments may be made based on design and implementation requirements.

Figure 4:
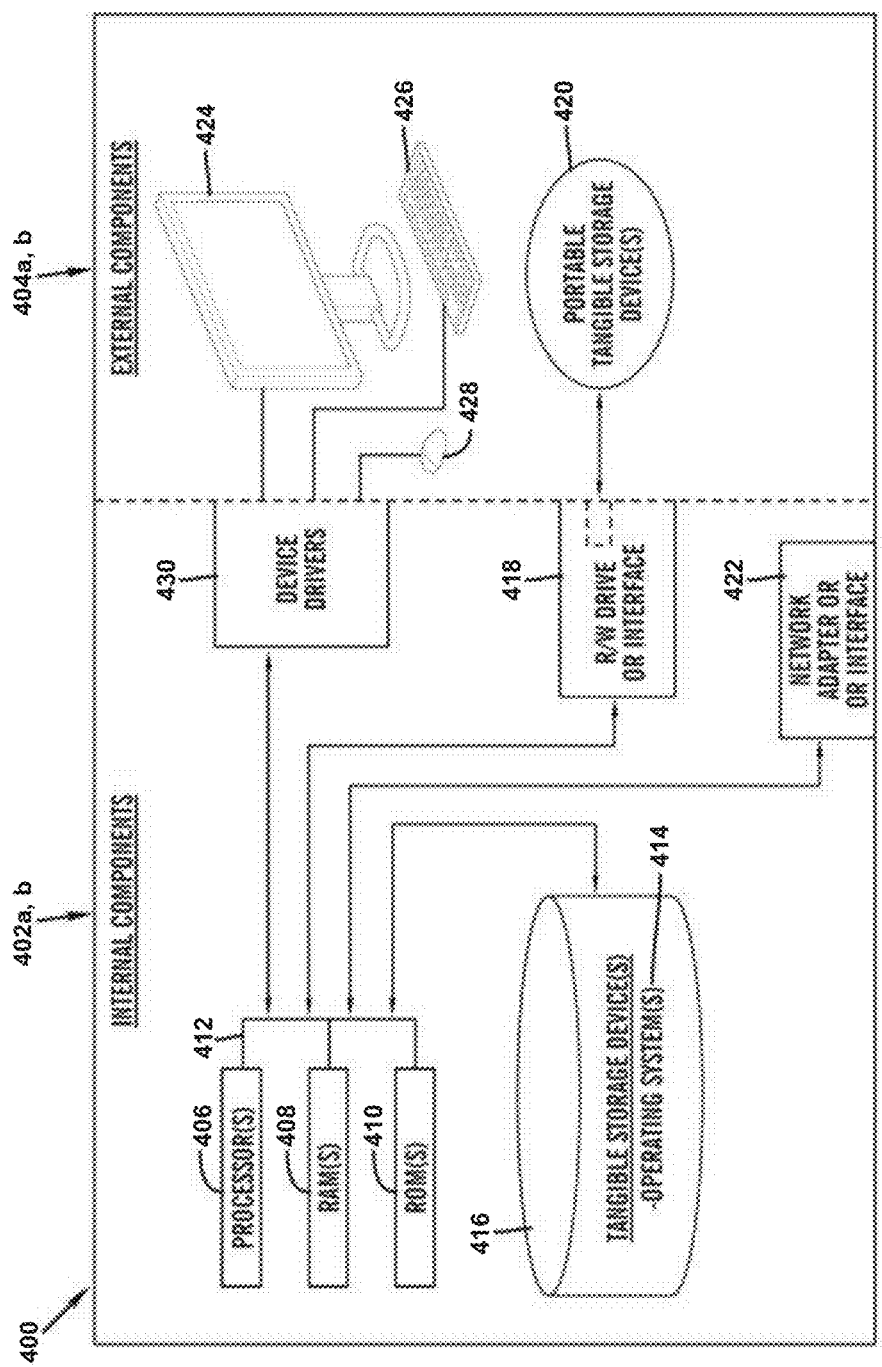
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402, 404 is representative of any electronic device capable of executing machine-readable program instructions. Data processing system 402, 404 may be representative of a smart phone, a computer system, PDA, or other electronic devices. Examples of computing systems, environments, and/or configurations that may represented by data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 402 a, b and external components 404 a, b illustrated in FIG. 4. Each of the sets of internal components 402 a, b includes one or more processors 406, one or more computer-readable RAMs 408 and one or more computer-readable ROMs 410 on one or more buses 412, and one or more operating systems 414 and one or more computer-readable tangible storage devices 416. The one or more operating systems 414 and programs such as a traffic obfuscation program 108a and 108b (FIG. 1), may be stored on one or more computer-readable tangible storage devices 416 for execution by one or more processors 406 via one or more RAMs 408 (which typically include cache memory). In the embodiment illustrated in FIG. 4, each of the computer-readable tangible storage devices 416 is a magnetic disk storage device of an internal hard drive. Alternatively, each of the computer-readable tangible storage devices 416 is a semiconductor storage device such as ROM 410, EPROM, flash memory or any other computer-readable tangible storage device that can store a computer program and digital information.

Each set of internal components 402 a, b also includes a R/W drive or interface 418 to read from and write to one or more portable computer-readable tangible storage devices 420 such as a CD-ROM, DVD, memory stick, magnetic tape, magnetic disk, optical disk or semiconductor storage device. The traffic obfuscation program 108a and 108b (FIG. 1) can be stored on one or more of the respective portable computer-readable tangible storage devices 420, read via the respective R/W drive or interface 418 and loaded into the respective hard drive 416.

Each set of internal components 402 a, b may also include network adapters (or switch port cards) or interfaces 422 such as a TCP/IP adapter cards, wireless wi-fi interface cards, or 3G or 4G wireless interface cards or other wired or wireless communication links. The traffic obfuscation program 108a (FIG. 1) in client computer 102 (FIG. 1) and the traffic obfuscation program 108b (FIG. 1) in network server computer 110 (FIG. 1) can be downloaded from an external computer (e.g., server) via a network (for example, the Internet, a local area network or other, wide area network) and respective network adapters or interfaces 422. From the network adapters (or switch port adaptors) or interfaces 422, the traffic obfuscation program 108a (FIG. 1) in client computer 102 (FIG. 1) and the traffic obfuscation program 108b (FIG. 1) in network server computer 110 (FIG. 1) are loaded into the respective hard drive 416. The network may comprise copper wires, optical fibers, wireless transmission, routers, firewalls, switches, gateway computers and/or edge servers.

Each of the sets of external components 404 a, b can include a computer display monitor 424, a keyboard 426, and a computer mouse 428. External components 404 a, b can also include touch screens, virtual keyboards, touch pads, pointing devices, and other human interface devices. Each of the sets of internal components 402 a, b also includes device drivers 430 to interface to computer display monitor 424, keyboard 426 and computer mouse 428. The device drivers 430, R/W drive or interface 418 and network adapter or interface 422 comprise hardware and software (stored in storage device 416 and/or ROM 410).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
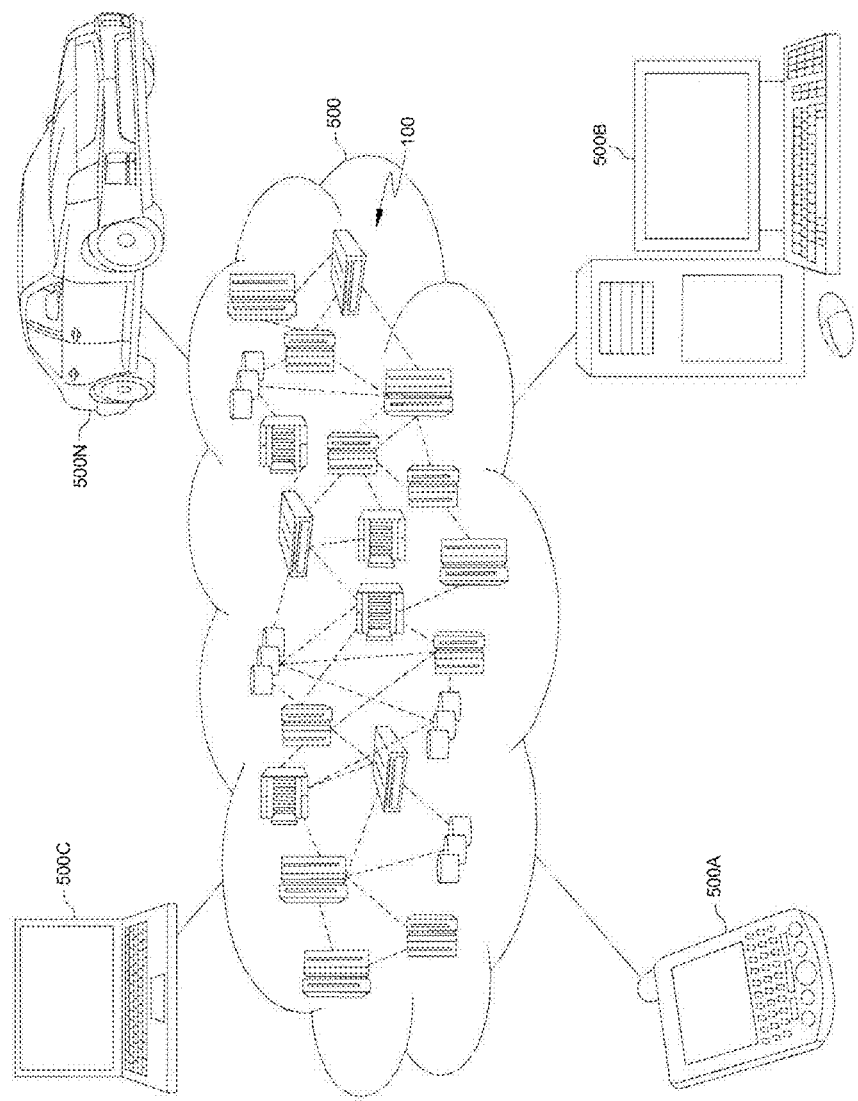
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
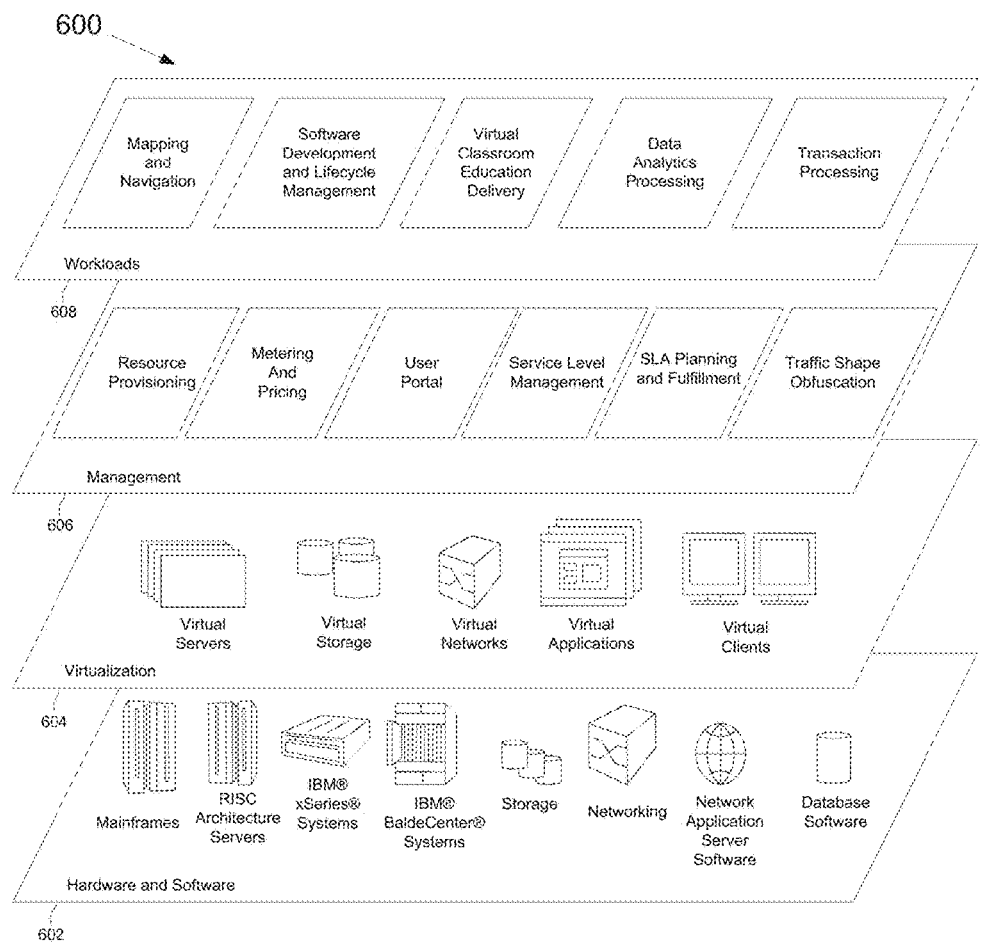
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 602 includes hardware and software components. Examples of hardware components include: mainframes; RISC (Reduced Instruction Set Computer) architecture based servers; storage devices; networks and networking components. In some embodiments, software components include network application server software.

Virtualization layer 604 provides an abstraction layer from which the following examples of virtual entities may be provided: virtual servers; virtual storage; virtual networks, including virtual private networks; virtual applications and operating systems; and virtual clients.

In one example, management layer 606 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Traffic shape obfuscation provides for traffic pattern obfuscation by introducing white-noise packets.

Workloads layer 608 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for obfuscating a traffic pattern associated with a plurality of network traffic at a packet level within a tunnel connection, the method comprising:
  detecting the tunnel connection;
  analyzing a connection environment associated with the detected tunnel connection;
  determining a packet handling technique based on the analyzed connection environment, wherein the packet handling technique provides a way for creating a noise packet that will be discarded by a network stack at a target node or before the target node;
  generating the plurality of noise packets based on the determined packet handling technique; and
  interleaving the generated plurality of noise packets within the plurality of network traffic based on an active time obfuscation strategy, wherein the active time obfuscation strategy comprises sending the interleaved plurality of noise packets into the tunnel connection with the plurality of network traffic to increase a current network traffic volume by 10% to 20% to obfuscate the traffic pattern in response to determining that the current network traffic volume is between 20% and 50% of a saturation point, and wherein the active time obfuscation strategy comprises sending the interleaved plurality of noise packets into the tunnel connection with the plurality of network traffic to increase the current network traffic volume by 5% to 10% to obfuscate the traffic pattern in response to determining that the current network traffic volume is between 50% and 70% of the saturation point.

2. The method of claim 1, further comprising:
  determining if the connection environment has changed;
  analyzing the connection environment associated with the detected tunnel connection for a new packet handling technique based on determining that the connection environment has changed; and
  sending the plurality of noise packets into the tunnel connection according to the determined noise strategy and the new packet handling technique based on re-analyzing the connection environment.

3. The method of claim 1, wherein the packet handling technique comprises using at least one of a time to live (TTL) technique, a max hops technique, a maximum transmission unit (MTU) technique, a malformed packet technique, an algorithm change technique, a transmission replay technique, a packet fragmentation technique, and a packet drop technique.

4. The method of claim 1, wherein sending the plurality of noise packets into the tunnel connection comprises generating the plurality of noise packets based on the packet handling technique.

5. The method of claim 1, wherein determining the packet handling technique comprises testing the packet handling technique by creating a plurality of test packets and iteratively manipulating a packet attribute associated with the plurality of test packets based on where the plurality of test packets are discarded by the network stack.

6. The method of claim 1, wherein the tunnel connection is encrypted.

* * * * *